(12) United States Patent
Gustie et al.

(10) Patent No.: US 11,954,475 B2
(45) Date of Patent: Apr. 9, 2024

(54) SYSTEM, METHOD, AND SERVER FOR OPTIMIZING DEPLOYMENT OF CONTAINERIZED APPLICATIONS

(71) Applicant: Gram Labs, Inc., Cambridge, MA (US)

(72) Inventors: Jeremy Gustie, Williston, VT (US); James Hochadel, Arlington, VA (US); Ofer Idan, Alexandria, VA (US); Thibaut Perol, Washington, DC (US); John Platt, Washington, DC (US)

(73) Assignee: Gram Labs, Inc., Cambridge, MA (US)

( * ) Notice: Subject to any disclaimer, the term of this patent is extended or adjusted under 35 U.S.C. 154(b) by 0 days.

(21) Appl. No.: 17/150,753

(22) Filed: Jan. 15, 2021

(65) Prior Publication Data

US 2022/0019420 A1 Jan. 20, 2022

Related U.S. Application Data

(63) Continuation of application No. PCT/US2020/042554, filed on Jul. 17, 2020.

(51) Int. Cl.
*G06F 9/44* (2018.01)
*G06F 8/65* (2018.01)
(Continued)

(52) U.S. Cl.
CPC .............. *G06F 8/65* (2013.01); *G06F 8/71* (2013.01); *G06F 11/3608* (2013.01)

(58) Field of Classification Search
CPC ..... G06F 8/35; G06F 8/53; G06F 8/60; G06F 8/65; G06F 8/71; G06F 8/76; G06F 8/77;
(Continued)

(56) References Cited

U.S. PATENT DOCUMENTS 9,311,159 B2 * 4/2016 Mao ..................... G06F 9/5027
10,331,810 B2 * 6/2019 Stadlbauer ........... G05B 13/041
(Continued)

FOREIGN PATENT DOCUMENTS

WO 2012/163986 A1 12/2012

OTHER PUBLICATIONS

Search Report and Written Opinion dated Oct. 13, 2020, issued in corresponding application PCT/US20/42554.

*Primary Examiner* — Hang Pan
*Assistant Examiner* — Lenin Paulino
(74) *Attorney, Agent, or Firm* — Oblon, McClelland, Maier & Neustadt, L.L.P.

(57) ABSTRACT

A system, method, and server for optimizing deployment of a containerized application. The system includes a machine and a server configured to receive optimization criteria related to the containerized application, the optimization criteria including affecting parameters, effected metrics, and stopping criteria. The server is further configured to transmit at least one value of the affecting parameter to the machine, receive results of a trial of the containerized application performed by the machine according to the transmitted at least one value, the results of the trial including an empirical value of the effected metrics, update an optimization model based on the trial results, compare the results of the trial and the updated optimization model to the one or more stopping criteria, and transmit an optimized one of the at least one value of the affecting parameters to the machine for deployment of the containerized application.

17 Claims, 9 Drawing Sheets

(51) Int. Cl.
*G06F 8/71* (2018.01)
*G06F 11/36* (2006.01)

(58) Field of Classification Search
CPC ... G06F 8/443; G06F 9/44584; G06F 11/3608
See application file for complete search history.

(56) References Cited

U.S. PATENT DOCUMENTS

| | | | |
|---|---|---|---|
| 2010/0235136 A1* | 9/2010 | Bassett | G01R 31/31835 |
| | | | 702/120 |
| 2014/0156570 A1* | 6/2014 | Randerath | G06N 5/02 |
| | | | 706/46 |
| 2019/0163536 A1* | 5/2019 | Parees | G06F 9/4881 |
| 2020/0111018 A1* | 4/2020 | Golovin | G06F 17/11 |
| 2020/0210576 A1* | 7/2020 | Chistyakov | G06N 5/025 |
| 2020/0396148 A1* | 12/2020 | Schibler | G06F 9/45558 |
| 2021/0149652 A1* | 5/2021 | Eschinger | G06F 8/60 |
| 2021/0182170 A1* | 6/2021 | Vedurumudi | G06F 11/3006 |

* cited by examiner

SYSTEM, METHOD, AND SERVER FOR OPTIMIZING DEPLOYMENT OF CONTAINERIZED APPLICATIONS

CROSS-REFERENCE TO RELATED APPLICATIONS

The present application is a continuation of International Patent Application No. PCT/US2020/042554, filed Jul. 17, 2020, which is incorporated by reference herein in its entirety for all purposes.

BACKGROUND

Field of the Disclosure

The present disclosure relates to orchestration of containerized applications.

Description of the Related Art

Containers offer a logical packaging mechanism in which applications can be abstracted from the environment in which they actually run. This allows container-based, or containerized, applications to be consistently deployed regardless of whether the target environment is a private data center, the public cloud, or a developer's personal laptop. Like virtual machines, which offer a guest operating system (OS) that runs on top of a host OS with virtualized access to the underlying hardware, containers allow an application to be packaged together with libraries and other dependencies, thereby providing isolated environments for running software services. Containers, however, offer a far more lightweight unit for developers and information technology operations teams to work with, which carries with it myriad benefits. For instance, instead of virtualizing a hardware stack, containers virtualize at the OS level, with multiple containers running directly on the OS kernel. By sharing the OS kernel, containerized applications can start much faster and use a fraction of the memory consumed by booting an entire OS. Moreover, containers allow developers to package applications together with their dependencies in a single, succinct manifest that can be version controlled and allow for easy replication of the application across developers on a given team and machines across a cluster.

For these reasons, containerized applications, and container orchestrators like Kubernetes, Docker Swarm, and Apache Mesos, are ubiquitously deployed. For instance, containerized applications and associated orchestrators can be found in finance, telecommunications, and e-commerce.

Of course, as more companies adopt and deploy containerized applications, a diverse range of issues with implementing containerized workloads has emerged. An inability to efficiently assign correct values to internal application parameters in order to achieve optimal performance with minimal resource utilization, for instance, otherwise known as application 'tuning', plagues a number of container adopters. For these companies, application 'tuning' remains an arduous task that is often done manually by trial-and-error methods, an understandably time-consuming process that inefficiently applies engineering resources while providing suboptimal configurations. As a result, only a small percentage of cloud instances are appropriately sized for their respective workloads, thus leading to a significant waste of resources.

Current solutions focus on reacting to issues that arise after applications have been deployed by monitoring application performance and resources and attempting to reallocate resources or fix issues before the applications crash. In view of the need to tune applications without disruption to internal or user-facing processes, this can be a risky and time-consuming process, where the problem may only surface after costs have escalated to unmanageable levels or customers are experiencing service disruptions.

Accordingly, the present disclosure describes an automated process for optimizing deployment of containerized applications.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a system, method, and server for optimizing deployment of a containerized application.

According to an embodiment, the present disclosure further relates to a system for optimizing deployment of a containerized application, the system comprising a machine, and a server having processing circuitry configured to receive optimization criteria related to the containerized application from the machine, the optimization criteria including one or more affecting parameters, one or more effected metrics, and one or more stopping criteria, transmit, based on the received optimization criteria, at least one value of the one or more affecting parameters to the machine, receive results of a trial of the containerized application performed by the machine according to the at least one value of the one or more affecting parameters, the results of the trial including an empirical value of the one or more effected metrics, update an optimization model based on the at least one value of the one or more affecting parameters and the empirical value of the one or more effected metrics, compare the results of the trial and the updated optimization model to the one or more stopping criteria, select, when the comparison indicates the one or more stopping criteria are satisfied, an optimized one of the at least one value of the one or more affecting parameters, and transmit the optimized one of the at least one value of the one or more affecting parameters to the machine for deployment of the containerized application, wherein the processing circuitry of the server is further configured to calculate a subsequent at least one value of the one or more affecting parameters based on the updated optimization model when the comparison of the results of the trial and the updated optimization model to the one or more stopping criteria indicates the one or more stopping criteria are not satisfied, transmit the subsequent at least one value of the one or more affecting parameters to the machine, receive, based on a subsequent trial of the containerized application performed by the machine according to the subsequent at least one value of the one or more affecting parameters, results of the subsequent trial including a subsequent empirical value of the one or more effected metrics, iteratively update the updated optimization model based on the subsequent at least one value of the one or more affecting parameters and the subsequent empirical value of the one or more effected metrics, compare the results of the subsequent trial and the iteratively updated optimization model to the one or more stopping criteria, select, when the comparison indicates the one or more stopping criteria are satisfied, an optimized one of the at least one value of the one or more affecting parameters, and transmit the optimized one of the at least one value of the one or more affecting parameters to the machine for deployment of the containerized application.

According to an embodiment, the present disclosure further relates to a method for optimizing deployment of a containerized application, the method comprising receiving, by a server, optimization criteria related to the containerized application, the optimization criteria including one or more affecting parameters, one or more effected metrics, and one or more stopping criteria based on the one or more effected metrics, receiving, by the server and based on a trial of the containerized application according to at least one value of the one or more affecting parameters, results of the trial including an empirical value of the one or more effected metrics, updating, by the server, an optimization model based on the at least one value of the one or more affecting parameters and the empirical value of the one or more effected metrics, comparing, by the server, the results of the trial and the updated optimization model to the one or more stopping criteria, selecting, by the server and when the comparing indicates the one or more stopping criteria are satisfied, an optimized one of the at least one value of the one or more affecting parameters, and transmitting the optimized one of the at least one value of the one or more affecting parameters to a machine for deployment of the containerized application, wherein the method further comprises calculating, by the server and when the results of the trial and the updated optimization model do not satisfy the one or more stopping criteria, a subsequent at least one value of the one or more affecting parameters based on the updated optimization model, receiving, by the server and based on a subsequent trial of the containerized application according to the subsequent at least one value of the one or more affecting parameters, results of the subsequent trial including a subsequent empirical value of the one or more effected metrics, iteratively updating, by the server, the updated optimization model based on the subsequent at least one value of the one or more affecting parameters and the subsequent empirical value of the one or more effected metrics, comparing, by the server, the results of the subsequent trial and the iteratively updated optimization model to the one or more stopping criteria, selecting, by the server and when the comparing indicates the one or more stopping criteria are satisfied, an optimized one of the at least one value of the one or more affecting parameters, and transmitting, by the server, the optimized one of the at least one value of the one or more affecting parameters to the machine for deployment of the containerized application.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
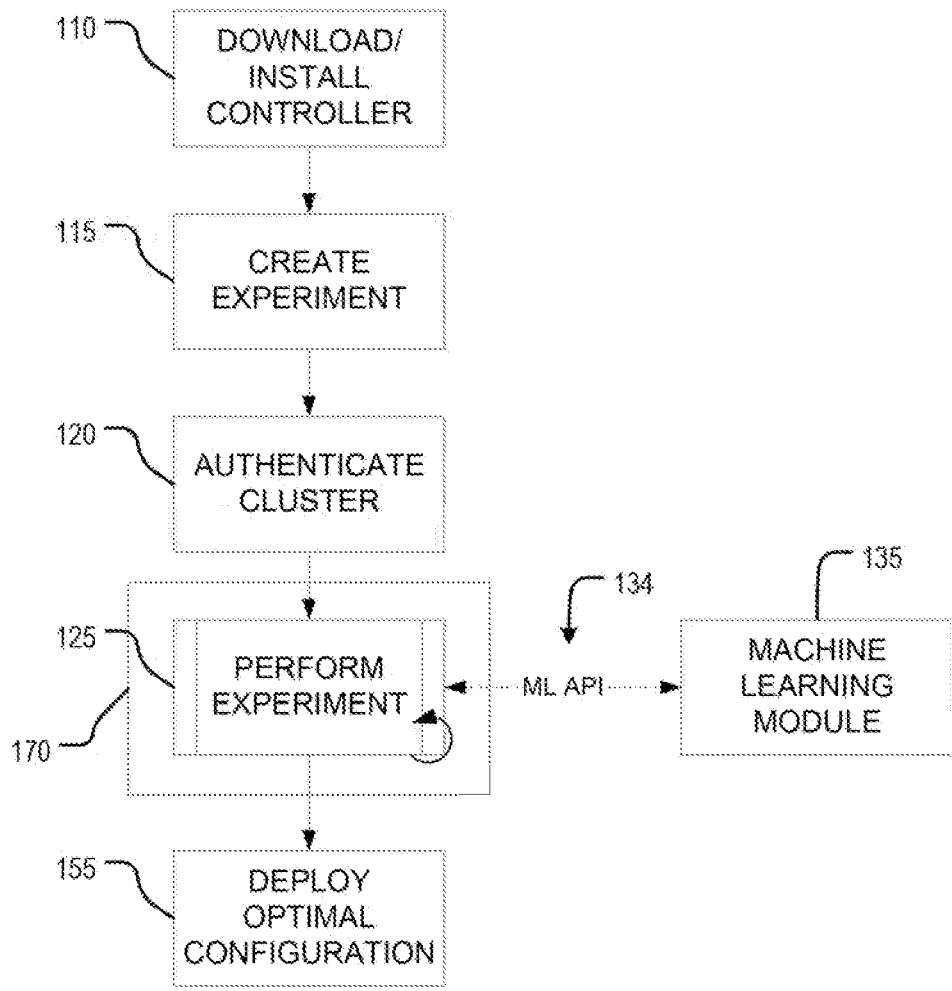
FIG. 1 is a flow diagram of a method for optimizing deployment of a containerized application, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

As described above, application 'tuning' is an unabashedly arduous but necessary process. For most application developers, however, application 'tuning' is a manual process wherein engineers guess correct parameter values, attempt to deploy an application based on the guessed parameter values, monitor the results of the deployment, and tweak the guessed parameter values in order to find an operable set. This iterative, trial and error process is time consuming for engineering teams and does not result in a true optimization, instead providing a 'good enough' set of parameter values. Moreover, in this way, each 'new' set of parameter value suggestions is not informed in any way other than being different from a prior guess. In order to efficiently perform application 'tuning', an automated approach that intelligently generates new parameter suggestions, thus freeing engineers to focus on other tasks, is required.

Therefore, according to an embodiment, the present disclosure describes an automated approach to application 'tuning'. In an embodiment, machine learning techniques may be implemented to perform the optimization step, the result of which is a faster optimization with improved results.

According to an embodiment, the present disclosure describes an automated method for optimizing containerized applications using a machine learning-based process. The automated method combines the machine learning-based process with a controller for container orchestration (i.e., Kubernetes) capable of creating experimental copies of an application in a development environment. The development environment may exist on a machine(s) such as a personal computer and the like. The development environment and a deployment environment may be hosted on a same machine(s) or a different machine(s). For example a development team, having a series of machines, may be separate from a deployment team having another series of machines. As described below, however, reference only to a single, co-functional machine will be made for clarity.

In an embodiment, the controller, coupled to a machine learning module via a machine learning application program interface (API), can perform trials within the development environment based on parameter value suggestions received from the machine learning module via the machine learning API. The parameter value suggestions may be made for one or more parameters. Results of each trial, which include metric values, can be sent to the machine learning module via the machine learning API, an optimization model of application deployment can be updated based on the tried parameter values and the resulting metric values, and new parameter value suggestions based on the updated optimization model can be evaluated by the controller in a new trial. This experimental loop, consisting of iterative trials, can be performed until certain stopping criteria have been achieved. In one instance, the stopping criteria can be a user determining that a most recently evaluated set of parameter values generates an optimal set of metric values. In another instance, the stopping criteria can be a number of completed trials and an optimal set of parameter values can be selected from a series of tried parameter values as those that maximize a metric(s).

It can be appreciated that the above-described method can be implemented, in an embodiment, within a system that includes a cloud-based network. In this way, a machine, having processing circuitry, of a user (e.g. application development team member) is able to access and cooperate with remote processing circuitry (e.g. a remote server) via the cloud-based network. For instance, the controller may be based on the machine of the user and the machine learning module may be based on the remote processing circuitry and accessible via the machine learning API. Moreover, the user may be a development team member of a company that runs a plurality of nodes across a respective communications network, the plurality of nodes running containerized applications that are deployed based on optimal parameter values determined by the remote processing circuitry in conjunction with the development team member.

Turning now to FIG. 1, a high-level flow diagram of a method for optimizing deployment of containerized applications is described. For clarity, FIG. 1 is described from the perspective of a user or developer implementing a container orchestrator such as Kubernetes.

At step 105 of method 100, the user may download a command line interface (CLI) software from a server to a respective machine and install a controller using the CLI software. The controller may be configured to perform an experiment that includes, as introduced above and as will be discussed with respect to sub process 125 of method 100, iterative trials of sets of parameter values suggested by a machine learning module of the server via a machine learning API and to provide, to the machine learning module via the machine learning API, results of each of the performed trials.

At step 115 of method 100, an experiment file defining the configurations of the experiment performed by the controller can be created. The experiment configurations can be determined by the user and may include guidance for performing load testing of the containerized application, parameters of interest, metrics of interest, and acceptable stopping criteria, among others. While specific description of experiment configurations will be described with respect to FIG. 3A through FIG. 3C, it can be appreciated that the experiment file can take the form of any one of a plurality of known configuration file frameworks. In an example, the experiment file may be a YAML (YAML Aint Markup Language)-based file, YAML being a human friendly data serialization standard that follows Python indentation and is a JSON superset.

In an embodiment, the guidance for performing the load testing of the containerized application, included in the experiment file, may be directed to the process of putting demand on the containerized application and measuring its performance. For instance, in providing instructions regarding how to install/connect/execute load testing, the guidance may stipulate a number of current users of the containerized application, thereby defining an anticipated load on the containerized application.

In an embodiment, the experiment file can be used to store configuration parameters, such as initial parameters and settings, of a containerized application on which an experiment will be performed. Further, the experiment file can include input or output file locations, input parameters for a machine learning model, output metrics for the machine learning model, in addition to other inputs for the machine learning model that instruct processes thereof. For instance, the input parameters may include parameter names, whether a minimum value or maximum value of the input parameter is desired, and a numerical relationship describing two or more input parameters. e.g. a value of one input parameter must be greater than another. The output metrics may include metric names, how to obtain the output metrics, and whether each output metric should be minimized or maximized as a part of the optimization process.

In an exemplary embodiment, the input parameters for the machine learning model and the output metrics for the machine learning model may be considered components of optimization criteria defined by the user. As described above, the optimization criteria may include an indication of whether the output metrics should be maximized, minimized, and the like. The input parameters and the output metrics may be defined further by value ranges within which optimization may be identified.

In an embodiment, the experiment file may further include instructions for performing an experiment based on given input parameters, input parameter values, and output metrics, the instructions including a workflow for the experiment and how iterative trials should be performed. For instance, the experiment file may define each trial to include: (1) sending instructions to the controller for performing load testing on the containerized application and (2) measuring and recording performance metric outputs based on the performed load testing. Moreover, the experiment file may provide instructions for installing and configuring the containerized application for each trial. In an embodiment, each iterative trial may include installation/uninstallation of the containerized application on a machine prior to/after performance of the load testing and measurement of output metrics. In another embodiment, the containerized application may be installed on the machine prior to an initial trial including load testing and measurement of output metrics and each iterative trial may include altering a desired state of a configuration of the containerized application to a new set of input parameter values.

At step 120 of method 10, the controller can be authenticated via the CLI software and establish an initial connection (not shown) with a machine learning module of the server via a machine learning API.

Once the controller is authenticated via the CLI software, the containerized application and the experiment file can be deployed to a development environment 170 of the machine. Accordingly, at sub process 125 of method 100, an experiment defined by the experiment file can be performed.

Described briefly, this includes transmission of a set of parameter values from a machine learning module 135 of the server to the controller via a machine learning API 134, trying of the set of parameter values by the controller at the machine, transmission of output metric values based on the trial of the set of parameter values from the machine to the server, updating a model of the machine learning module 135 based on the values of the output metrics, and transmission of a new set of parameter values based on the updated model to the machine.

As indicated above, the trials performed during the experimentation of sub process 125 of method 100 can be performed iteratively based on communication between the controller and the machine learning module 135 via the machine learning API 134. Performance of the experiment at sub process 125 of method 1M can continue until the stopping criteria defined within the experiment rile created at step 115 of method 100 are satisfied. Sub process 125 of method 100 will be described in further detail with respect to FIG. 4 through FIG. 6.

Having performed the experiment, an optimal configuration selected at sub process 125 of method 100 can be deployed to a containerized application within one or more nodes.

Figure 2:
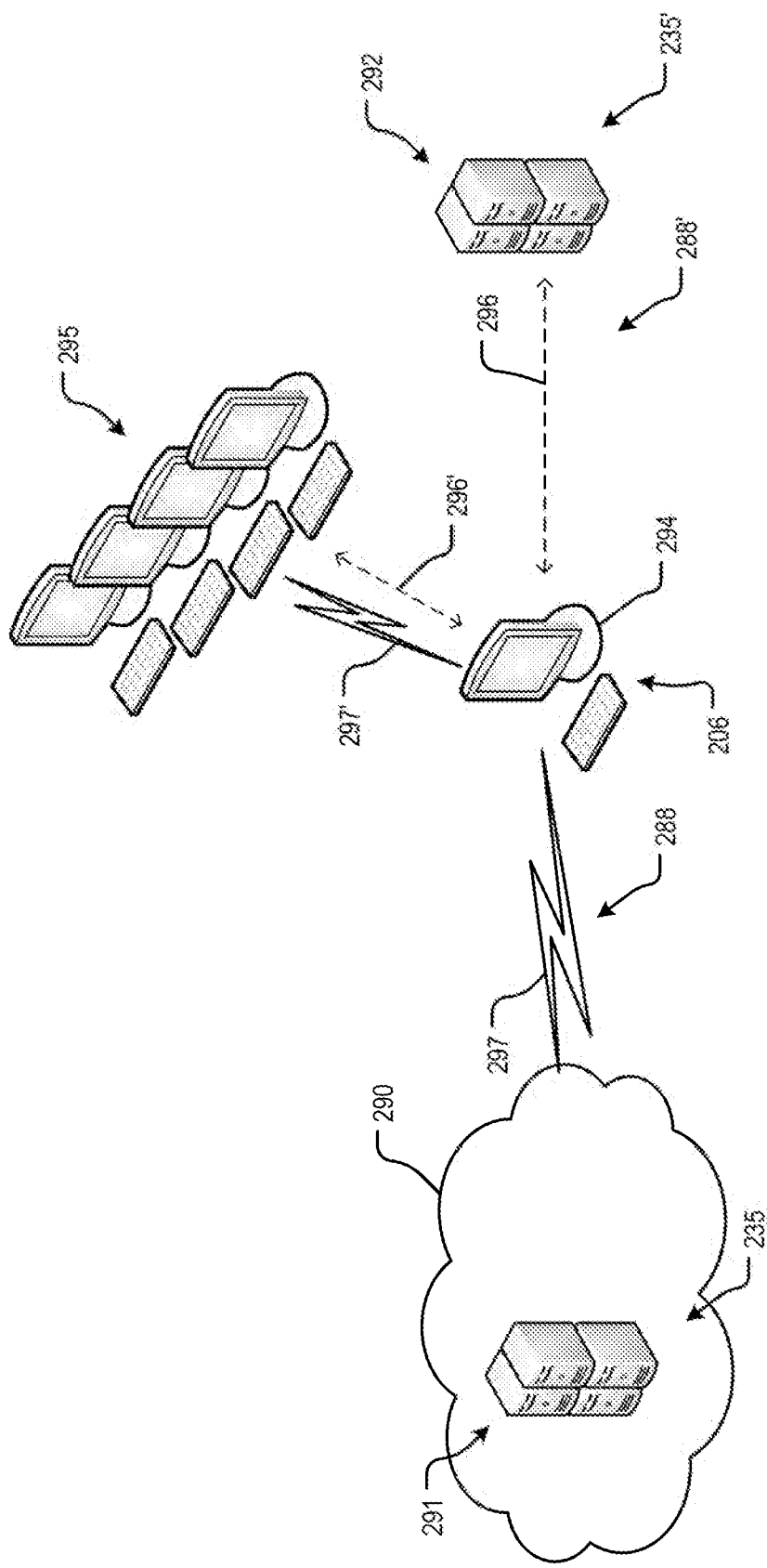
FIG. 2 is a schematic of network communications between remote and local processing circuitry, according to an exemplary embodiment of the present disclosure.

The flow diagram of FIG. 1 can be implemented within the network schematic of FIG. 2, which illustrates communication between the controller at the user machine, the machine learning module at the server, and nodes or machines that run the containerized application.

According to an embodiment of the present disclosure, a controller 206 may reside at a user machine, referred to here as a local development machine 294. The local development machine 294 may be in network communication 288 with remote servers 291 within a cloud-computing environment 290, the remote servers 291 hosting a machine learning module 235. As described above, the controller 206 at the local development machine 294 may interact with the machine learning module 235 in the cloud-computing environment 290 via a machine learning API through a remote network connection 297.

In an embodiment, the local development machine 294 may be in network communication 288' with local servers 292 via network connection 288', the local servers 292 hosting a machine learning module 235'. As described above, the controller 206 at the local development machine 294 may interact with the machine learning module 235' via a machine learning API through a local network connection 296.

According to an embodiment of the present disclosure, whether the machine learning module 235, 235' is hosted by the remote servers 291 or the local servers 292, an experiment may be performed at the local development machine 294 and optimal parameter values for a containerized application may be deployed therefrom to one or more nodes 295 configured to execute the containerized application. To this end, the local development machine 294 may be in local network connection 296' or remote network connection 297' with the one or more nodes 295.

Figure 3A:
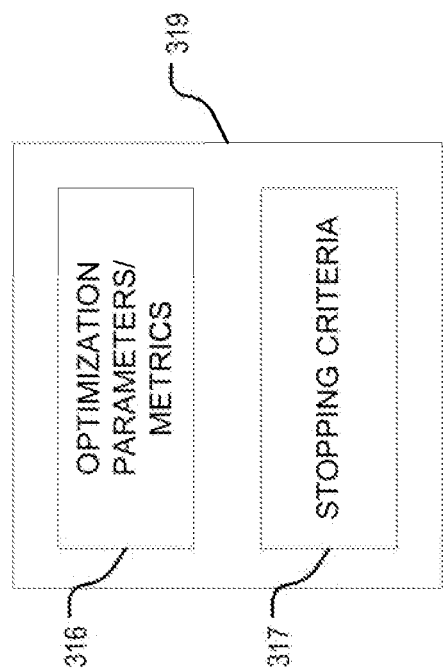
FIG. 3A is a schematic of components of a step of a method for optimizing deployment of a containerized application, according to an exemplary embodiment of the present disclosure.
Figure 3B:
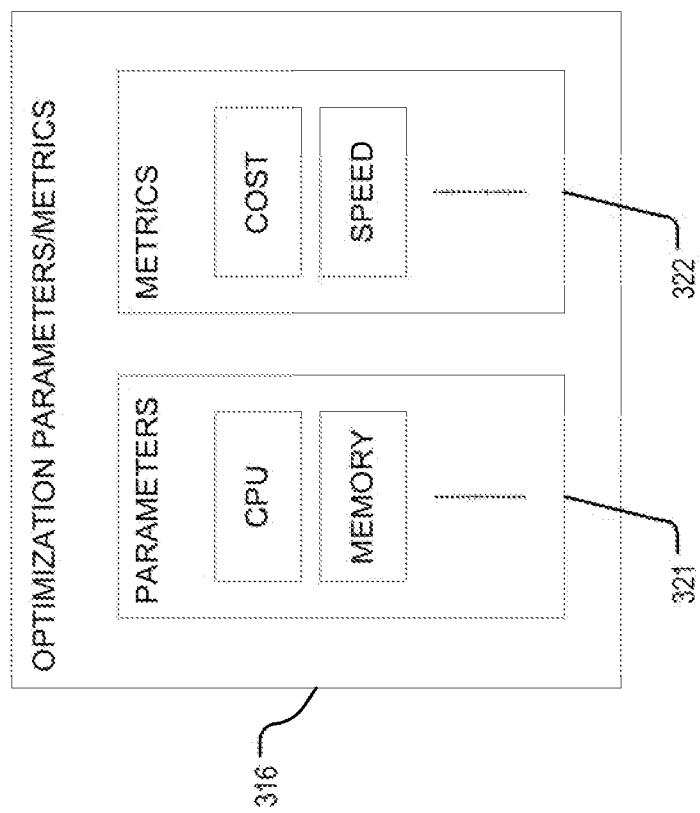
FIG. 3B is a schematic of components of a step of a method for optimizing deployment of a containerized application, according to an exemplary embodiment of the present disclosure.

Step 115 of method 100 will now be further described with reference to FIG. 3A through FIG. 3C. As described above, the experiment file may define the configurations of the experiment to be performed by the controller in the development environment. This can include, as in FIG. 3A, optimization criteria 319. The optimization criteria 319 may include optimization parameters and metrics 316 of interest to the user as well as stopping criteria 317 that provide guidelines for determining an optimal parameter value set. The optimization parameters and metrics 316, or tuning parameters and metrics, may include, as in FIG. 3B, parameters 321 such as processor and memory usage and metrics 322 such as speed and cost. Of course, the parameters and metrics of FIG. 3B should be considered non-limiting, as they are merely representative of a number of application- and machine-related parameters and metrics. For instance, the input parameters may also include data batch size, batch delay, heap size, number of replicas, and wait times, while the output metrics may also include resource utilization, latency, throughput, time to completion, and error rate.

Figure 3C:
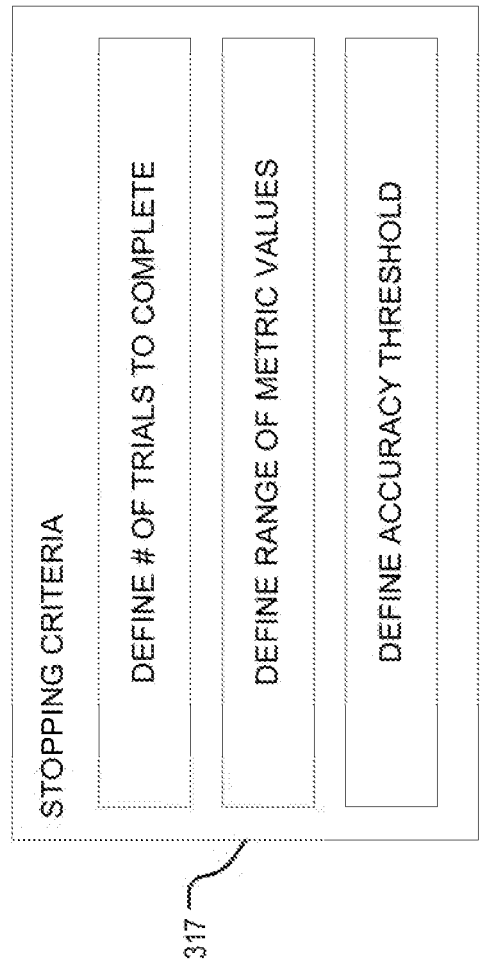
FIG. 3C is a schematic of components of a step of a method for optimizing deployment of a containerized application, according to an exemplary embodiment of the present disclosure.

The stopping criteria 317, as in FIG. 3C, may include, among others, a number of trials to be performed, a range of metric values to be obtained, or an accuracy threshold to be obtained. Though the stopping criteria 317 described here will be described in further detail with reference to FIG. 6, it can be appreciated that the stopping criteria 317 may be any criterion by which an optimal set of parameter values are selected. The developer may define within the experiment file the stopping criteria that define an optimal set of parameter values. For instance, the stopping criteria 317 may define a desired range of output metric values and the experiment file may stipulate that, upon achieving output metric values within the desired range of output metric values, a corresponding set of parameter values are used for deployment of a containerized application. Moreover, the stopping criteria 317 may one or more criterion. For instance, the stopping criteria 317 may define a number of trials to be performed in addition to a desired range of output metric values, a corresponding experiment file stipulating that, in the absence of the desired range of output metric values being achieved before completing the number of trials, a set of parameter values already evaluated is to be selected as the optimal set of parameter values.

Figure 4:
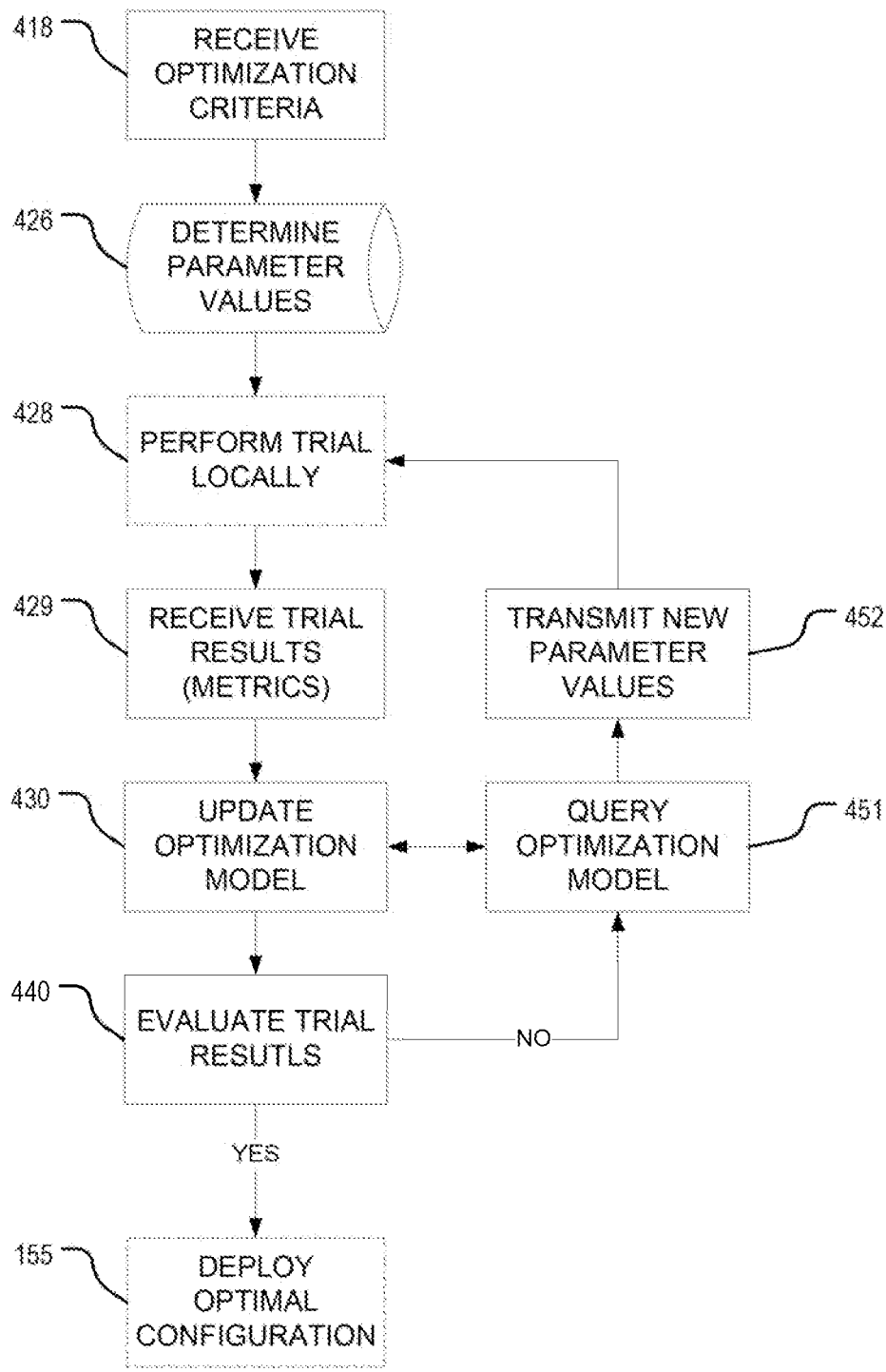
FIG. 4 is a flow diagram of a method for optimizing deployment of a containerized application, according to an exemplary embodiment of the present disclosure.

With reference now to FIG. 4, the experiment of sub process 125 of method 100 will be described. For clarity, sub process 125 of method 100 will be described from the perspective of a machine learning module at a server in communication with a controller at a local development machine. The server may be a remote server or a local server.

At step 418 of sub process 125, optimization criteria defined in the experiment file can be obtained from the controller via the machine learning API. The optimization criteria may define, among others, one or more parameters of interest and one or more metrics of interest.

At step 426 of sub process 125, an initial set of parameter values may be determined based on the received optimization criteria of step 418 of sub process 125. The initial set of parameter values, which may be one or more of a series of randomly selected parameter values evaluated a priori, in an example, are intended to initially probe an input space of an optimization model such that the optimization model can be further evaluated and populated with informed parameter values and corresponding metric values. In other words, previous parameter values and corresponding metric values inform future parameter value selection. It can, of course, be appreciated that the number of parameter values evaluated and the number of metric values measured is not limiting or limited to the description herein, and can each, separately or together, be any number greater than or equal to one.

At step 428 of sub process 125, the initial set of parameter values may be evaluated by the controller during a trial of the containerized application. The trial of the containerized application may include, as described above, a load test to evaluate performance of the containerized application under the constraints of the initial set of parameter values and in view of one or more metric values. Step 428 of sub process 125 is dashed to indicate that this step is performed by the controller and not the machine learning module.

Trial results, including the one or more metric values, can be received by the machine learning module at the server at step 429 of sub process 125. Accordingly, at step 430 of sub process 125, the optimization model can be updated based on the trial results. The process for updating the optimization model depends on the type of model implemented. For instance, the optimization model may be one of a group including grid search, Monte Carlo simulation, genetic algorithms, Bayesian optimization, and random search. Generally, however, the process can include populating a data space of an optimization model, the data space containing a number of data points (e.g. inputs and outputs), with additional inputs and outputs and updating the optimization model based on the populating. In this way, the updated optimization model may be made increasingly accurate at modeling input parameter values and corresponding output metric values. Moreover, the updated optimization model, in view of the accuracy of the model, may be the basis for intelligently determining a subsequent parameter value to evaluate at the controller.

At step 440 of sub process 125, the trial results can be evaluated in view of the updated optimization model in order to determine if optimal parameter values can be determined. Though described in more detail with respect to FIG. 6, it can be appreciated that step 440 of sub process 125 serves as a decision point for determining whether additional trial iterations are required in view of stopping criteria defined in the experiment file. If it is determined that the stopping criteria are achieved at step 440 of sub process 125, an optimal set of parameter values can be selected and deployed as an optimal configuration.

If, however, it is determined at step 440 of sub process 125 that the stopping criteria have not been satisfied, sub process 125 continues to step 451 wherein a new set of parameter values is obtained from the optimization model of the machine learning module. The new set of parameter values can be recommended to the controller in view of, in an example, a balance between exploration and exploitation of the optimization model. For instance, if relatively few parameter values of the optimization model have been explored, it may be advantageous to evaluate a diverse representation of possible parameter values of the optimization model in order to increase the accuracy of the optimization model, writ large. In another instance, however, the confidence of the optimization model may be relatively high in a region of the model believed to be a near optimal configuration, and so it may be advantageous to continue evaluating possible parameter values of the optimization model that are near to this region of parameter values. In any event, it can be appreciated that the new set of parameter values determined at step 451 of sub process 125 are based on the updated optimization model and are efficiently selected.

The recommended parameter values queried from the optimization model at step 451 of sub process 125 may be sent from the machine learning module to the controller at step 452 of sub process 125. Accordingly, a subsequent trial may be performed beginning at step 428 of sub process 125 and following the workflow described above.

Figure 5:
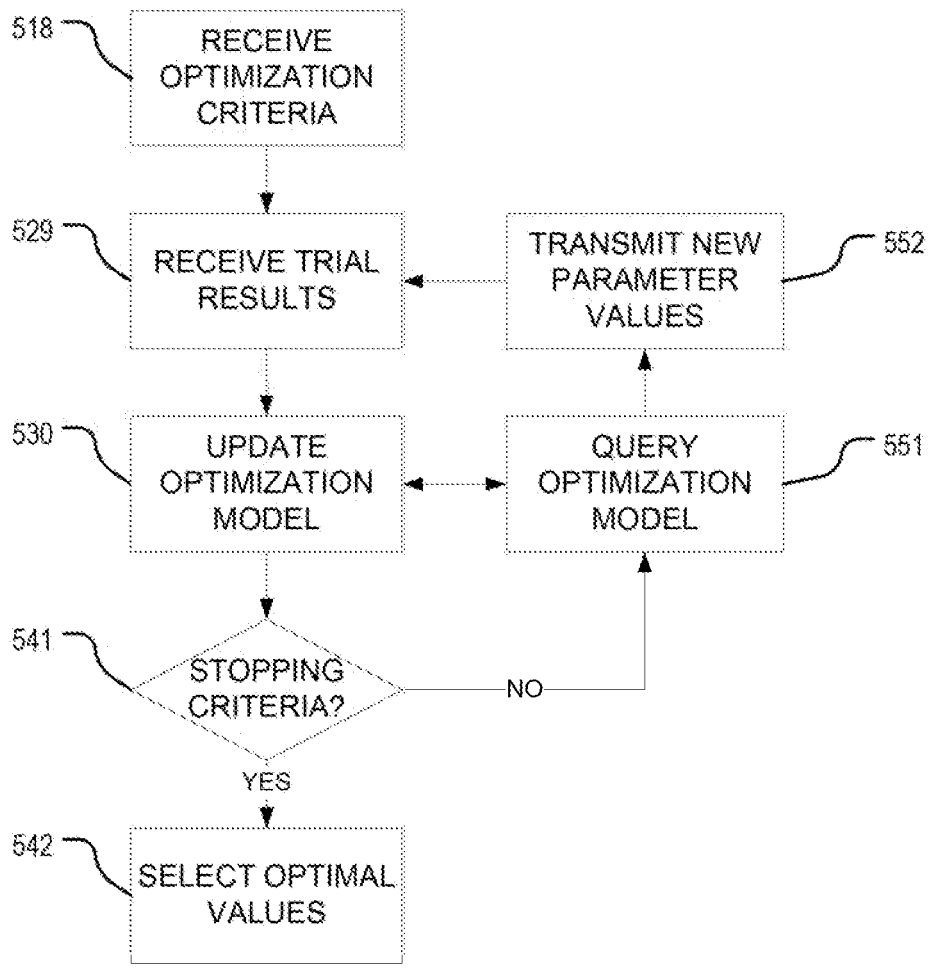
FIG. 5 is a flow diagram of a method for optimizing deployment of a containerized application, according to an exemplary embodiment of the present disclosure.

FIG. 5 provides a condensed description of FIG. 4, with an emphasis on the machine teaming module at the server and steps performed thereon. As above, the server may be a remote server or a local server.

At step 518 of sub process 125, optimization criteria defined in the experiment file can be received from the controller via the machine learning API. The optimization criteria define, among others, one or more parameters of interest and one or more metrics of interest.

At step 529 of sub process 125, trial results, which include one or more metric values, or effected values, from a trial performed by the controller based on one or more parameter values, or one or more affecting parameter values, are received by the machine learning module at the server.

Accordingly, at step 530 of subprocess 125, an optimization model can be updated by the machine learning module based on the trial results. The process for updating the optimization model depends on the type of model implemented. Generally, however, the process can include populating a data space of the optimization model, the data space containing a number of data points (e.g. affecting parameter values and corresponding effected metric values), with additional trial-based data points and updating the optimization model based on the populating. In this way, the updated optimization model may be made increasingly accurate at modeling input affecting parameter values and corresponding output effected values.

At step 541 of sub process 125, the trial results can be evaluated in view of the updated optimization model and in order to determine if optimal parameter values can be selected. Though described in more detail with respect to FIG. 6, it can be appreciated that step 541 of sub process 125 serves as a decision point for determining whether additional trial iterations are required in view of stopping criteria defined in the experiment file. If it is determined that the stopping criteria are achieved at step 541 of sub process 125, an optimal set of parameter values can be selected and deployed to a machine or one or more nodes as an optimal configuration.

Figure 6:
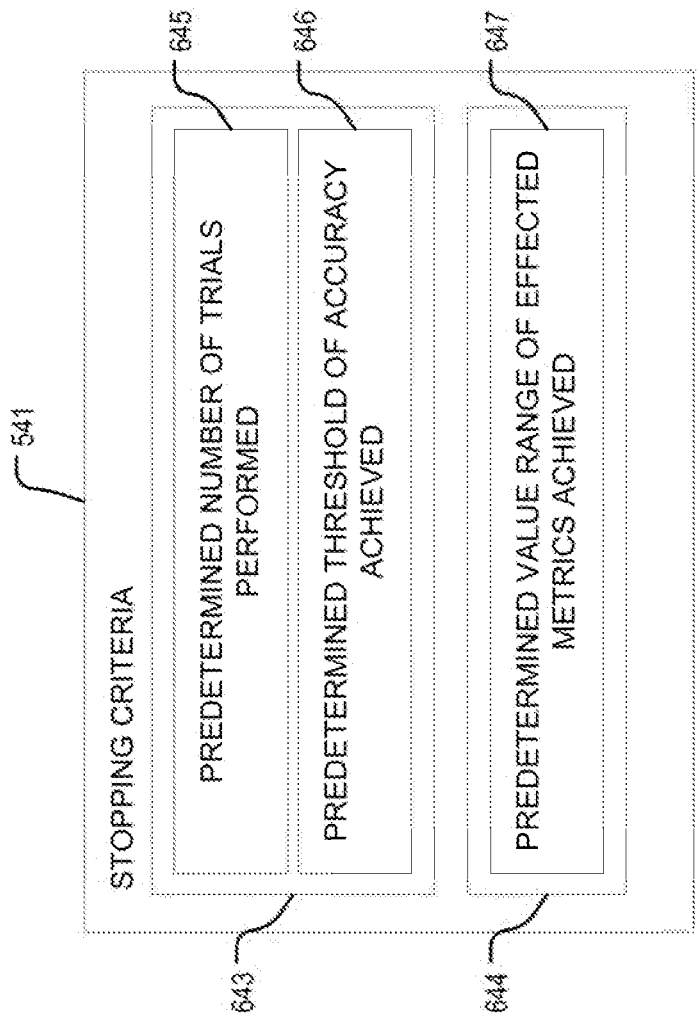
FIG. 6 is a schematic of components of a sub process of a method for optimizing deployment of a containerized application, according to an exemplary embodiment of the present disclosure.

To this end and with reference now to FIG. 6, step 541 of sub process 125 will be further described. At step 541 of sub process 125, trial results can be evaluated in view of an updated optimization model in order to determine if optimal parameter values can be determined. This includes an evaluation of stopping criteria as they may be applied to the trial results and the updated optimization model.

According to an embodiment, the stopping criteria may include cumulative stopping criteria 643 and instant stopping criteria 644. The cumulative stopping criteria 643 may be applied in instances where the entirety of the trial results is considered in selecting an optimal configuration of affecting parameter values. The instant stopping criteria 644 may be applied in instances where the last tried affecting parameter values are determined to result in desired effected metric values. Moreover, the cumulative stopping criteria 643 and the instant stopping criteria 644 may each be defined in an experiment file and may be applied concurrently, as appropriate. For instance, the experiment file may stipulate that the instant stopping criteria 644 should be followed until that point at which the cumulative stopping criteria 643 are satisfied.

In an embodiment, the cumulative stopping criteria 643 may include a predetermined number of trials performed 645 and/or a predetermined threshold of accuracy achieved 646. For instance, iterative trials may proceed until the predetermined number of trials performed is reached, at which point the affecting parameter values resulting in a maximum, minimum, or other statistical measure of the effected metric results is selected as the optimal configuration for deployment. In another instance, iterative trials may proceed until the updated optimization model is defined sufficiently that a predetermined accuracy level of the model is achieved. Accuracy may be defined according to an anticipated output metric value and a corresponding realized output metric value measured during a trial, an error value therebetween defining the accuracy level of the model. Having achieved a maximum level of accuracy, an affecting parameter value that resulted in a maximum, minimum, or other statistical measure of the effected metric results can be selected as the optimal configuration for deployment of the containerized application.

In an embodiment, the instant stopping criteria 644 may include a predetermined value range of effected metric values that is achieved. For instance, iterative trials of affecting parameter values can proceed until trial results indicate effected metric values are within a user-defined value range that is deemed desirable. In such a case, the last tried affecting parameter values can be selected as the optimal configuration for deployment of the containerized application.

Returning now to FIG. 5, if, however, it is determined at step 541 of sub process 125 that the stopping criteria have not been satisfied, sub process 125 continues to step 551 wherein a new set of parameter values, or affecting parameter values, is obtained from the optimization model of the machine learning module. The new set of affecting values can be recommended to the controller in view of a balance between exploration and exploitation of the optimization model, as described above.

The recommended affecting values queried from the optimization model at step 551 of sub process 125 may be sent from the machine learning module to the controller at step 552 of sub process 125. Accordingly, a subsequent trial may be performed and trial results therefrom may be received beginning at step 529 of sub process 125. The workflow may proceed iteratively, as needed.

Figure 7:
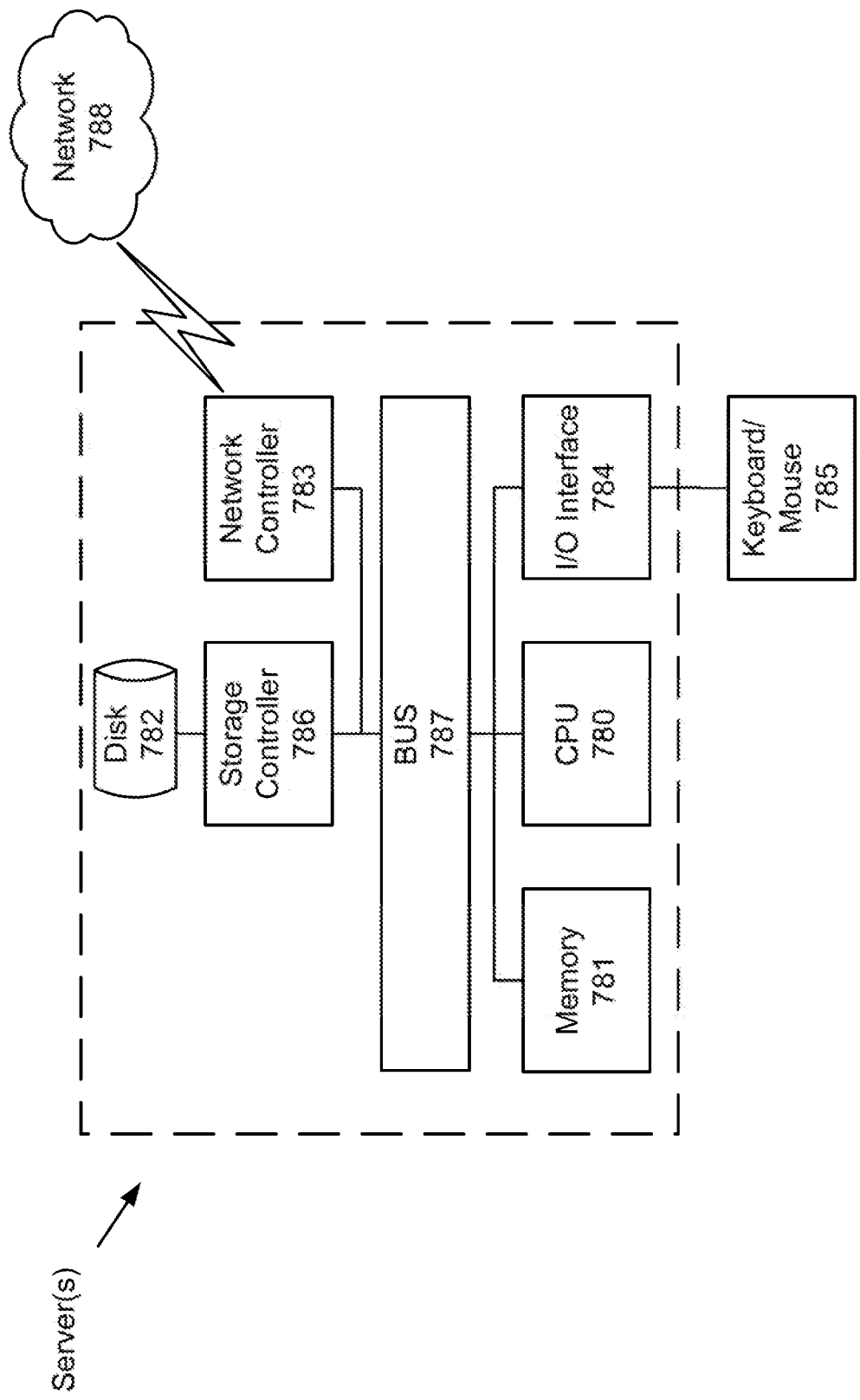
FIG. 7 is schematic of a hardware configuration of a server for performing a method for optimizing deployment of a containerized application, according to an exemplary embodiment of the present disclosure.

Next, a hardware description of the sever, including the machine learning module, according to exemplary embodiments of the present disclosure, is described with reference to FIG. 7. In FIG. 7, the server includes a CPU 780 which performs the processes described above/below. The process data and instructions may be stored in memory 781. These processes and instructions may also be stored on a storage medium disk 782 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server communicates, such as other servers or machines.

Further, the claimed advancements may be provided as a utility application, background daemon, or component of an operating system, or combination thereof, executing in conjunction with CPU 780 and an operating system such as Microsoft Windows 7, Microsoft Windows 10, UNIX, Solaris, LINUX, Apple MAC-OS, and other systems known to those skilled in the art.

The hardware elements in order to achieve the server may be realized by various circuitry elements, known to those skilled in the art. For example, CPU 780 may be a Xenon or Core processor from Intel of America or an Opteron processor from AMD of America, or may be other processor types that would be recognized by one of ordinary skill in the art. Alternatively, the CPU 780 may be implemented on an FPGA, ASIC, PLD or using discrete logic circuits, as one of ordinary skill in the art would recognize. Further, CPU 780 may be implemented as multiple processors cooperatively working in parallel to perform the instructions of the inventive processes described above.

The server in FIG. 7 also includes a network controller 783, such as an Intel Ethernet PRO network interface card from Intel Corporation of America, for interfacing with network 788. In view of FIG. 2, it can be appreciated that the network 788 can be a public network, such as the Internet, or a private network such as an LAN or WAN network, or any combination thereof, and can also include PSTN or ISDN sub-networks. The network 788 can also be wired, such as an Ethernet network, or can be wireless such as a cellular network including EDGE, 3G and 4G wireless cellular systems. The wireless network can also be WiFi, Bluetooth, or any other wireless form of communication that is known.

In certain embodiment, the server is connected to or functions as a computer terminal. To this end, the server may further include a general purpose I/O interface 784 that interfaces with a keyboard and/or mouse 785 as well as a touch screen panel on or separate from a display. The general purpose I/O interface 784 may also connect to a variety of peripherals, as necessary.

The general purpose storage controller 786 connects the storage medium disk 782 with communication bus 787, which may be an ISA, EISA, VESA, PCI, or similar, for interconnecting all of the components of the server. A description of the general features and functionality of the display, keyboard and/or mouse 785, as well as a display controller, storage controller 786, network controller 783, and general purpose I/O interface 784 is omitted herein for brevity as these features are known.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A system for optimizing deployment of a containerized application, the system comprising a machine, and a server having processing circuitry configured to receive optimization criteria related to the containerized application from the machine, the optimization criteria including one or more affecting parameters, one or more effected metrics, and one or more stopping criteria, transmit, based on the received optimization criteria, at least one value of the one or more affecting parameters to the machine, receive results of a trial of the containerized application performed by the machine according to the at least one value of the one or more affecting parameters, the results of the trial including an empirical value of the one or more effected metrics, update an optimization model based on the at least one value of the one or more affecting parameters and the empirical value of the one or more effected metrics, compare the results of the trial and the updated optimization model to the one or more stopping criteria, select, when the comparison indicates the one or more stopping criteria are satisfied, an optimized one of the at least one value of the one or more affecting parameters, and transmit the optimized one of the at least one value of the one or more affecting parameters to the machine for deployment of the containerized application.

(2) The system according to (1), wherein the processing circuitry of the server is further configured to calculate a subsequent at least one value of the one or more affecting parameters based on the updated optimization model when the comparison of the results of the trial and the updated optimization model to the one or more stopping criteria indicates the one or more stopping criteria are not satisfied, transmit the subsequent at least one value of the one or more affecting parameters to the machine, receive, based on a subsequent trial of the containerized application performed by the machine according to the subsequent at least one value of the one or more affecting parameters, results of the subsequent trial including a subsequent empirical value of the one or more effected metrics, iteratively update the updated optimization model based on the subsequent at least one value of the one or more affecting parameters and the subsequent empirical value of the one or more effected metrics, compare the results of the subsequent trial and the iteratively updated optimization model to the one or more stopping criteria, select, when the comparison indicates the one or more stopping criteria are satisfied, an optimized one of the at least one value of the one or more affecting parameters, and transmit the optimized one of the at least one value of the one or more affecting parameters to the machine for deployment of the containerized application.

(3) The system according to either (1) or (2), wherein the one or more stopping criteria include a maximum number of trials to be performed.

(4) The system according to any one of (1) to (3), wherein the one or more stopping criteria include a maximum level of accuracy in the updated optimization model.

(5) The system according to any one of (1) to (4), wherein the one or more stopping criteria include a range of empirical values of the one or more effected metrics.

(6) A method for optimizing deployment of a containerized application, the method comprising receiving, by a server, optimization criteria related to the containerized application, the optimization criteria including one or more affecting parameters, one or more effected metrics, and one or more stopping criteria based on the one or more effected metrics, receiving, by the server and based on a trial of the containerized application according to at least one value of the one or more affecting parameters, results of the trial including an empirical value of the one or more effected metrics, updating, by the server, an optimization model based on the at least one value of the one or more affecting parameters and the empirical value of the one or more effected metrics, comparing, by the server, the results of the trial and the updated optimization model to the one or more stopping criteria, selecting, by the server and when the comparing indicates the one or more stopping criteria are satisfied, an optimized one of the at least one value of the one or more affecting parameters, and transmitting the optimized one of the at least one value of the one or more affecting parameters to a machine for deployment of the containerized application.

(7) The method according to (6), further comprising calculating, by the server and when the results of the trial and the updated optimization model do not satisfy the one or more stopping criteria, a subsequent at least one value of the one or more affecting parameters based on the updated optimization model, receiving, by the server and based on a subsequent trial of the containerized application according to the subsequent at least one value of the one or more affecting parameters, results of the subsequent trial including a subsequent empirical value of the one or more effected metrics, iteratively updating, by the server, the updated optimization model based on the subsequent at least one value of the one or more affecting parameters and the subsequent empirical value of the one or more effected metrics, comparing, by the server, the results of the subsequent trial and the iteratively updated optimization model to the one or more stopping criteria, selecting, by the server and when the comparing indicates the one or more stopping criteria are satisfied, an optimized one of the at least one value of the one or more affecting parameters, and transmitting, by the server, the optimized one of the at least one value of the one or more affecting parameters to the machine for deployment of the containerized application.

(8) The method according to either (6) or (7), wherein the updating includes populating, by the server, the optimization model based on the at least one value of the one or more affecting parameters and the empirical value of the one or more effected metrics.

(9) The method according to any one of (6) to (8), wherein the at least one value of the one or more affecting parameters is calculated by the server.

(10) The method according to any one of (6) to (9), wherein the one or more stopping criteria include a maximum number of trials to be performed.

(11) The method according to any one of (6) to (10), wherein the one or more stopping criteria include a maximum level of accuracy in the updated optimization model.

(12) The method according to any one of (6) to (11), wherein the one or more stopping criteria include a range of empirical values of the one or more effected metrics.

(13) A non-transitory computer-readable storage medium storing computer-readable instructions that, when executed by a computer, cause the computer to perform a method for optimizing deployment of a containerized application, comprising receiving optimization criteria related to the containerized application, the optimization criteria including one or more affecting parameters, one or more effected metrics, and one or more stopping criteria based on the one or more effected metrics, receiving, based on a trial of the containerized application according to at least one value of the one or more affecting parameters, results of the trial including an empirical value of the one or more effected metrics, updating an optimization model based on the at least one value of the one or more affecting parameters and the empirical value of the one or more effected metrics, comparing the results of the trial and the updated optimization model to the one or more stopping criteria, selecting, when the comparing indicates the one or more stopping criteria are satisfied, an optimized one of the at least one value of the one or more affecting parameters, and transmitting the optimized one of the at least one value of the one or more affecting parameters to a machine for deployment of the containerized application.

(14) The non-transitory computer-readable storage medium according to (13), further comprising calculating, when the results of the trial and the updated optimization model do not satisfy the one or more stopping criteria, a subsequent value of the at last one value of the one or more affecting parameters based on the updated optimization model, receiving, based on a subsequent trial of the containerized application according to the subsequent value of the at least one value of the one or more affecting parameters, results of the subsequent trial including a subsequent empirical value of the one or more effected metrics, iteratively updating the updated optimization model based on the subsequent value of the at least one value of the one or more affecting parameters and the subsequent empirical value of the one or more effected metrics, comparing the results of the subsequent trial and the iteratively updated optimization model to the one or more stopping criteria, selecting, when the comparing indicates the one or more stopping criteria are satisfied, an optimized one of the at least one value of the one or more affecting parameters, and transmitting the optimized one of the at least one value of the one or more affecting parameters to the machine for deployment of the containerized application.

(15) The non-transitory computer-readable storage medium according to either (13) or (14), wherein the one or more stopping criteria include a maximum number of trials to be performed.

(16) The non-transitory computer-readable storage medium according to any one of (13) to (15), wherein the one or more stopping criteria include a maximum level of accuracy in the updated optimization model.

(17) The non-transitory computer-readable storage medium according to any one of (13) to (16), wherein the one or more stopping criteria include a range of empirical values of the one or more effected metrics.

(18) A server for optimizing deployment of a containerized application, the server comprising processing circuitry configured to receive optimization criteria related to the containerized application, the optimization criteria including one or more affecting parameters, one or more effected metrics, and one or more stopping criteria based on the one or more effected metrics, receive, based on a trial of the containerized application according to at least one value of the one or more affecting parameters, results of the trial including an empirical value of the one or more effected metrics, updating an optimization model based on the at least one value of the one or more affecting parameters and the empirical value of the one or more effected metrics, comparing the results of the trial and the updated optimization model to the one or more stopping criteria, selecting, when the comparing indicates the one or more stopping criteria are satisfied, an optimized one of the at least one value of the one or more affecting parameters, and transmitting the optimized one of the at least one value of the one or more affecting parameters to a machine for deployment of the containerized application.

(19) The server according to (18), wherein the processing circuitry is further configured to calculate, when the results of the trial and the updated optimization model do not satisfy the one or more stopping criteria, a subsequent value of the at last one value of the one or more affecting parameters based on the updated optimization model, receive, based on a subsequent trial of the containerized application according to the subsequent value of the at least one value of the one or more affecting parameters, results of the subsequent trial including a subsequent empirical value of the one or more effected metrics, iteratively update the updated optimization model based on the subsequent value of the at least one value of the one or more affecting parameters and the subsequent empirical value of the one or more effected metrics, compare the results of the subsequent trial and the iteratively updated optimization model to the one or more stopping criteria, select, when the comparing indicates the one or more stopping criteria are satisfied, an optimized one of the at least one value of the one or more affecting parameters, and transmit the optimized one of the at least one value of the one or more affecting parameters to the machine for deployment of the containerized application.

(20) The server according to either (18) or (19), wherein the processing circuitry is configured to update the optimization model by populating the optimization model based on the at least one value of the one or more affecting parameters and the empirical value of the one or more effected metrics.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for optimizing a configuration of a containerized application, the system comprising:
a machine; and
a server having processing circuitry configured to, prior to deployment of the containerized application,
receive an experiment file including instructions for performing load testing and optimization criteria related to the containerized application, from the machine, the optimization criteria including one or more affecting parameters, one or more effected metrics, and stopping criteria, the experiment file being a configuration file separate from the containerized application,
transmit, to the machine, based on the received experiment file, the instructions for performing the load testing and at least one value of the one or more affecting parameters that affect the execution and performance of the containerized application, receive, from the machine, results of a trial execution of the containerized application performed by the machine, prior to the deployment, using the at least one value of the one or more affecting parameters, the results of the trial execution including an empirical value of the one or more effected metrics resulting from the machine having completed the trial execution of the containerized application using the at least one value of the one or more affecting parameters, the trial execution of the containerized application being performed using the instructions for performing the load testing contained in the received experiment file and predetermined input values for the containerized application, update an optimization model based on the at least one value of the one or more affecting parameters and the empirical value of the one or more effected metrics, compare the results of the trial execution and the updated optimization model to respective ones of the stopping criteria, select, when the comparison indicates at least one of the stopping criteria are satisfied, the transmitted at least one value of the one or more affecting parameters as an optimized one of the at least one value of the one or more affecting parameters, and transmit the optimized one of the at least one value of the one or more affecting parameters to the machine for configuration and deployment of the containerized application, wherein, prior to the deployment, the machine reconfigures the containerized application using the optimized one of the at least one value of the one or more affecting parameters so that the performance of the containerized application is optimized; and wherein the machine is configured to deploy the reconfigured containerized application.

2. The system according to claim 1, wherein the processing circuitry of the server is further configured to calculate a subsequent at least one value of the one or more affecting parameters based on the updated optimization model when the comparison indicates the stopping criteria are not satisfied, transmit, to the machine, the subsequent at least one value of the one or more affecting parameters to the machine, receive, from the machine, based on a subsequent trial execution of the containerized application performed by the machine using the subsequent at least one value of the one or more affecting parameters, results of the subsequent trial execution including a subsequent empirical value of the one or more effected metrics, iteratively update the updated optimization model based on the subsequent at least one value of the one or more affecting parameters and the subsequent empirical value of the one or more effected metrics, compare the results of the subsequent trial execution and the iteratively updated optimization model to the respective ones of the stopping criteria, select, when the comparison of the results of the subsequent trial execution and the iteratively updated optimization model to the respective ones of the stopping criteria indicates at least one of the stopping criteria are satisfied, at least one tried value of the one or more affecting parameters as an optimized one of the at least one value of the one or more affecting parameters, and transmit the optimized one of the at least one value of the one or more affecting parameters to the machine for configuration of the containerized application.

3. The system according to claim 1, wherein the stopping criteria include a maximum number of trial executions to be performed.

4. The system according to claim 1, wherein the stopping criteria include a maximum level of accuracy in the updated optimization model.

5. The system according to claim 1, wherein the stopping criteria include a range of empirical values of the one or more effected metrics.

6. A method for optimizing a configuration of a containerized application, the method comprising, prior to deployment of the containerized application:

receiving, by a server, an experiment file including instructions for performing load testing and optimization criteria related to the containerized application, the optimization criteria including one or more affecting parameters and one or more effected metrics, the experiment file being a configuration file separate from the containerized application;

transmitting, to a machine, based on the received experiment file, instructions for performing the load testing and at least one value of the one or more affecting parameters that affect the execution and performance of the containerized application;

receiving, from the machine, based on a trial execution of the containerized application performed by the machine, prior to the deployment, using the at least one value of the one or more affecting parameters, results of the trial execution including an empirical value of the one or more effected metrics resulting from the machine having completed the trial execution of the containerized application using the at least one value of the one or more affecting parameters, the trial execution of the containerized application being performed using the instructions for performing the load testing contained in the received experiment file and predetermined input values for the containerized application;

updating, by the server, an optimization model based on the at least one value of the one or more affecting parameters and the empirical value of the one or more effected metrics, the updating including populating, by the server, the optimization model based on the at least one value of the one or more affecting parameters and the empirical value of the one or more effected metrics;

selecting, by the server and based on the updated optimization model, at least one tried value of the one or more affecting parameters as an optimized one of the at least one value of the one or more affecting parameters;

transmitting the optimized one of the at least one value of the one or more affecting parameters to a machine for configuration and deployment of the containerized application;

reconfiguring, prior to the deployment, the containerized application using the optimized one of the at least one value of the one or more affecting parameters so that the performance of the containerized application is optimized; and deploying the reconfigured containerized application, wherein the optimization criteria includes stopping criteria based on the one or more effected metrics and the selecting includes comparing, by the server, the results of the trial execution to at least one respective one of the stopping criteria, or comparing, by the server, the updated optimization model to at least one respective one of the stopping criteria, the optimized one of the at least one value of the one or more affecting parameters being selected when the comparing the updated optimization model to the at least one respective one of the stopping criteria indicates at least one of the stopping criteria are satisfied.

7. The method according to claim 6, further comprising
calculating, by the server and when the comparing indicates the stopping criteria are not satisfied, a subsequent at least one value of the one or more affecting parameters based on the updated optimization model,
receiving, from the machine, based on a subsequent trial execution of the containerized application performed by the machine using the subsequent at least one value of the one or more affecting parameters, results of the subsequent trial execution including a subsequent empirical value of the one or more effected metrics,
iteratively updating, by the server, the updated optimization model based on the subsequent at least one value of the one or more affecting parameters and the subsequent empirical value of the one or more effected metrics,
selecting, by the server and based on the iteratively updated optimization model, an optimized one of the at least one value of the one or more affecting parameters, and
transmitting, by the server, the optimized one of the at least one value of the one or more affecting parameters to the machine for configuration of the containerized application.

8. The method according to claim 7, wherein the selecting includes
comparing, by the server, the results of the subsequent trial execution to the at least one respective one of the stopping criteria, or
comparing, by the server, the iteratively updated optimization model to the at least one respective one of the stopping criteria, the optimized one of the at least one value of the one or more affecting parameters being selected when the comparing indicates at least one of the stopping criteria are satisfied.

9. The method according to claim 6, wherein the stopping criteria include a maximum number of trial executions to be performed.

10. The method according to claim 6, wherein the stopping criteria include a maximum level of accuracy in the updated optimization model.

11. The method according to claim 6, wherein the stopping criteria include a range of empirical values of the one or more effected metrics.

12. The method of claim 6, further comprising:
installing the containerized application on the machine prior to the trial execution of the containerized application on the machine; and
uninstalling the containerized application after the trial execution of the containerized application on the machine.

13. A non-transitory computer-readable storage medium storing computer-readable instructions that, when executed by a computer, cause the computer to perform a method for optimizing a configuration of a containerized application, comprising, prior to deployment of the containerized application:
receiving an experiment file including instructions for performing load testing and optimization criteria related to the containerized application, the optimization criteria including one or more affecting parameters and one or more effected metrics, the experiment file being a configuration file separate from the containerized application;
transmitting, to a machine, based on the received experiment file, the instructions for performing the load testing and at least one value of the one or more affecting parameters that affect the execution and performance of the containerized application;
receiving, from the machine, based on a trial execution of the containerized application performed by the machine, prior to the deployment, using the at least one value of the one or more affecting parameters, results of the trial execution including an empirical value of the one or more effected metrics resulting from the machine having completed the trial execution of the containerized application using the at least one value of the one or more affecting parameters, the trial execution of the containerized application being performed using the instructions for performing the load testing contained in the received experiment file and predetermined input values for the containerized application;
updating an optimization model based on the at least one value of the one or more affecting parameters and the empirical value of the one or more effected metrics;
selecting, based on the updated optimization model, at least one tried value of the one or more affecting parameters as an optimized one of the at least one value of the one or more affecting parameters;
transmitting the optimized one of the at least one value of the one or more affecting parameters to a machine for configuration and deployment of the containerized application;
reconfiguring, prior to the deployment, the containerized application using the optimized one of the at least one value of the one or more affecting parameters so that the performance of the containerized application is optimized; and
deploying the reconfigured containerized application,
wherein the optimization criteria includes stopping criteria based on the one or more effected metrics and the selecting includes
comparing the results of the trial execution to at least one respective one of the stopping criteria, or
comparing the updated optimization model to at least one respective one of the stopping criteria, the optimized one of the at least one value of the one or more affecting parameters being selected when the comparing the updated optimization model to the at least one respective one of the stopping criteria indicates at least one of the stopping criteria are satisfied.

14. The non-transitory computer-readable storage medium according to claim 13, wherein the updating includes
populating the optimization model based on the at least one value of the one or more affecting parameters and the empirical value of the one or more effected metrics.

15. The non-transitory computer-readable storage medium according to claim 13, further comprising:
calculating, when the comparing indicates the stopping criteria are not satisfied, a subsequent value of the at last one value of the one or more affecting parameters based on the updated optimization model,
receiving, from the machine, based on a subsequent trial execution of the containerized application performed by the machine using the subsequent value of the at least one value of the one or more affecting parameters, results of the subsequent trial execution including a subsequent empirical value of the one or more effected metrics, iteratively updating the updated optimization model based on the subsequent value of the at least one value of the one or more affecting parameters and the subsequent empirical value of the one or more effected metrics, selecting, based on the iteratively updated optimization model, an optimized one of the at least one value of the one or more affecting parameters, and transmitting the optimized one of the at least one value of the one or more affecting parameters to the machine for configuration of the containerized application.

16. A server for optimizing a configuration of a containerized application, the server comprising:

processing circuitry configured to, prior to deployment of the containerized application, receive an experiment file including instructions for performing load testing and optimization criteria related to the containerized application, the optimization criteria including one or more affecting parameters and one or more effected metrics, the experiment file being a configuration file separate from the containerized application, transmit, to a machine, based on the received experiment file, the instructions for performing the load testing and at least one value of the one or more affecting parameters that affect the execution and performance of the containerized application, receive, from the machine, based on a trial execution of the containerized application performed by the machine, prior to the deployment, using at least one value of the one or more affecting parameters, results of the trial execution including an empirical value of the one or more effected metrics resulting from the machine having completed the trial execution of the containerized application using the at least one value of the one or more affecting parameters, the trial execution of the containerized application being performed using the instructions for performing the load testing contained in the received experiment file and predetermined input values for the containerized application, updating an optimization model based on the at least one value of the one or more affecting parameters and the empirical value of the one or more effected metrics, selecting, based on the updated optimization model, an optimized one of the at least one value of the one or more affecting parameters, and transmitting the optimized one of the at least one value of the one or more affecting parameters to the machine for configuration and deployment of the containerized application, wherein the machine reconfigures, prior to the deployment, the containerized application using the optimized one of the at least one value of the one or more affecting parameters so that the performance of the containerized application is optimized, and deploys the reconfigured containerized application, wherein the optimization criteria includes stopping criteria based on the one or more effected metrics and the processing circuitry is further configured to select the optimized one of the at least one value of the one or more affecting parameters by comparing the results of the trial execution to at least one respective one of the stopping criteria, or comparing the updated optimization model to at least one respective one of the stopping criteria, the optimized one of the at least one value of the one or more affecting parameters being selected when the comparing the updated optimization model to the at least one respective one of the stopping criteria indicates at least one of the stopping criteria are satisfied.

17. The server according to claim 16, wherein the processing circuitry is further configured to calculate, when the comparing indicates the stopping criteria are not satisfied, a subsequent value of the at last one value of the one or more affecting parameters based on the updated optimization model, receive, from the machine, based on a subsequent trial execution of the containerized application performed by the machine using the subsequent value of the at least one value of the one or more affecting parameters, results of the subsequent trial execution including a subsequent empirical value of the one or more effected metrics, iteratively update the updated optimization model based on the subsequent value of the at least one value of the one or more affecting parameters and the subsequent empirical value of the one or more effected metrics, select, based on the iteratively updated optimization model, at least one tried value of the one or more affecting parameters as an optimized one of the at least one value of the one or more affecting parameters, and transmit the optimized one of the at least one value of the one or more affecting parameters to the machine for configuration of the containerized application.

* * * * *